United States Patent
Curle

(10) Patent No.: US 10,618,089 B2
(45) Date of Patent: Apr. 14, 2020

(54) SOLIDS HEAT EXCHANGER

(75) Inventor: William Curle, Glasgow (GB)

(73) Assignee: William Curle Developments Limited, Glasgow (GB)

( * ) Notice: Subject to any disclaimer, the term of this patent is extended or adjusted under 35 U.S.C. 154(b) by 135 days.

(21) Appl. No.: 13/635,185

(22) PCT Filed: Mar. 4, 2011

(86) PCT No.: PCT/GB2011/050424
§ 371 (c)(1),
(2), (4) Date: Oct. 31, 2012

(87) PCT Pub. No.: WO2011/114127
PCT Pub. Date: Sep. 22, 2011

(65) Prior Publication Data
US 2013/0043238 A1 Feb. 21, 2013

(30) Foreign Application Priority Data
Mar. 18, 2010 (GB) .................................. 1004535.9

(51) Int. Cl.
*F28F 5/00* (2006.01)
*H05B 6/02* (2006.01)
(Continued)

(52) U.S. Cl.
CPC .................. *B09C 1/06* (2013.01); *C10G 1/02* (2013.01); *E21B 21/066* (2013.01); *C10G 2300/1033* (2013.01); *F28D 7/16* (2013.01)

(58) Field of Classification Search
CPC .... B09C 1/06; C10G 1/02; C10G 2300/1033; F28D 7/16; E21B 21/066
(Continued)

(56) References Cited

U.S. PATENT DOCUMENTS 4,453,319 A * 6/1984 Morris .................. E21B 21/065
134/19
4,479,048 A * 10/1984 Kinoshita ............... B29B 17/00
165/87
(Continued)

FOREIGN PATENT DOCUMENTS

CN 101972773 A 2/2011
DE 19713714 A1 11/1997
(Continued)

OTHER PUBLICATIONS

Bauknecht, Maximillian, English Translation of DE 197 13 714 A1, 10 pgs.
(Continued)

*Primary Examiner* — Lorne E Meade
*Assistant Examiner* — Kuangyue Chen
(74) *Attorney, Agent, or Firm* — Nexsen Pruet, PLLC; David S. Bradin

(57) ABSTRACT

A solids heat exchanger (10) is in the form of a shell and tube arrangement having a shell section (11) through which heated oil (12) passes and a tube section (13). A screw conveyor (14) extends along its length and has a drive motor (15). Drill cuttings or other hydrocarbon contaminated materials are fed in through an inlet (16) and then conveyed along the tube (13) where heat transfer takes place. On exiting the tube (13) oil and water vapour rises and escapes through a first outlet (17) while the now cleaned drill cuttings or other materials fall through a second outlet (18) forming a discharge zone. The apparatus aims to reduce the oil content of the solids to less than 0.5%. The solids can then simply be disposed of. The base oil can be reclaimed and reused.

10 Claims, 4 Drawing Sheets

TYPICAL SECTION THROUGH SHE TUBE WORM

(51) Int. Cl.
*B09C 1/06* (2006.01)
*E21B 21/06* (2006.01)
*C10G 1/02* (2006.01)
*F28D 7/16* (2006.01)

(58) Field of Classification Search
USPC .............................................. 219/618; 165/86
See application file for complete search history.

(56) References Cited

U.S. PATENT DOCUMENTS

| | | | |
|---|---|---|---|
| 4,606,283 A | | 8/1986 | DesOrmeaux et al. |
| 4,974,528 A | * | 12/1990 | Barcell .......................... 110/240 |
| 5,072,674 A | * | 12/1991 | Noland ................. B09B 3/0091 |
| | | | 110/229 |
| 5,205,225 A | * | 4/1993 | Milsap, III .................... 110/240 |
| 6,901,868 B2 | * | 6/2005 | Hornung ................... C10B 7/10 |
| | | | 110/229 |
| 7,381,383 B1 | * | 6/2008 | Yokoyama et al. ........... 422/198 |
| 2006/0010712 A1 | * | 1/2006 | Carin ......................... C05F 3/00 |
| | | | 34/443 |
| 2012/0144690 A1 | * | 6/2012 | Abramov .................. F26B 5/04 |
| | | | 34/412 |

FOREIGN PATENT DOCUMENTS

| | | | |
|---|---|---|---|
| EP | 2086595 A | | 6/2008 |
| EP | 2086595 A2 | | 8/2009 |
| GB | 2071138 A | | 9/1981 |
| GB | 2456074 A | * | 7/2009 |
| WO | 01/83936 A1 | | 11/2001 |
| WO | 02/070151 | | 9/2002 |
| WO | 2003/055615 A1 | | 7/2003 |
| WO | 2008065002 A2 | | 6/2008 |
| WO | WO 2008065002 A2 | * | 6/2008 |

OTHER PUBLICATIONS

International Search Report and Written Opinion of the International Search Authority in Application No. PCT/GB2011/050424 (filed Apr. 3, 2011), dated Apr. 26, 2013.

Search Report for Canadian Application No. 2,793,645 dated Mar. 15, 2017.

* cited by examiner

TYPICAL SECTION THROUGH SHE TUBE WORM

SHE INTAKE SYSTEM OPTION ONLY

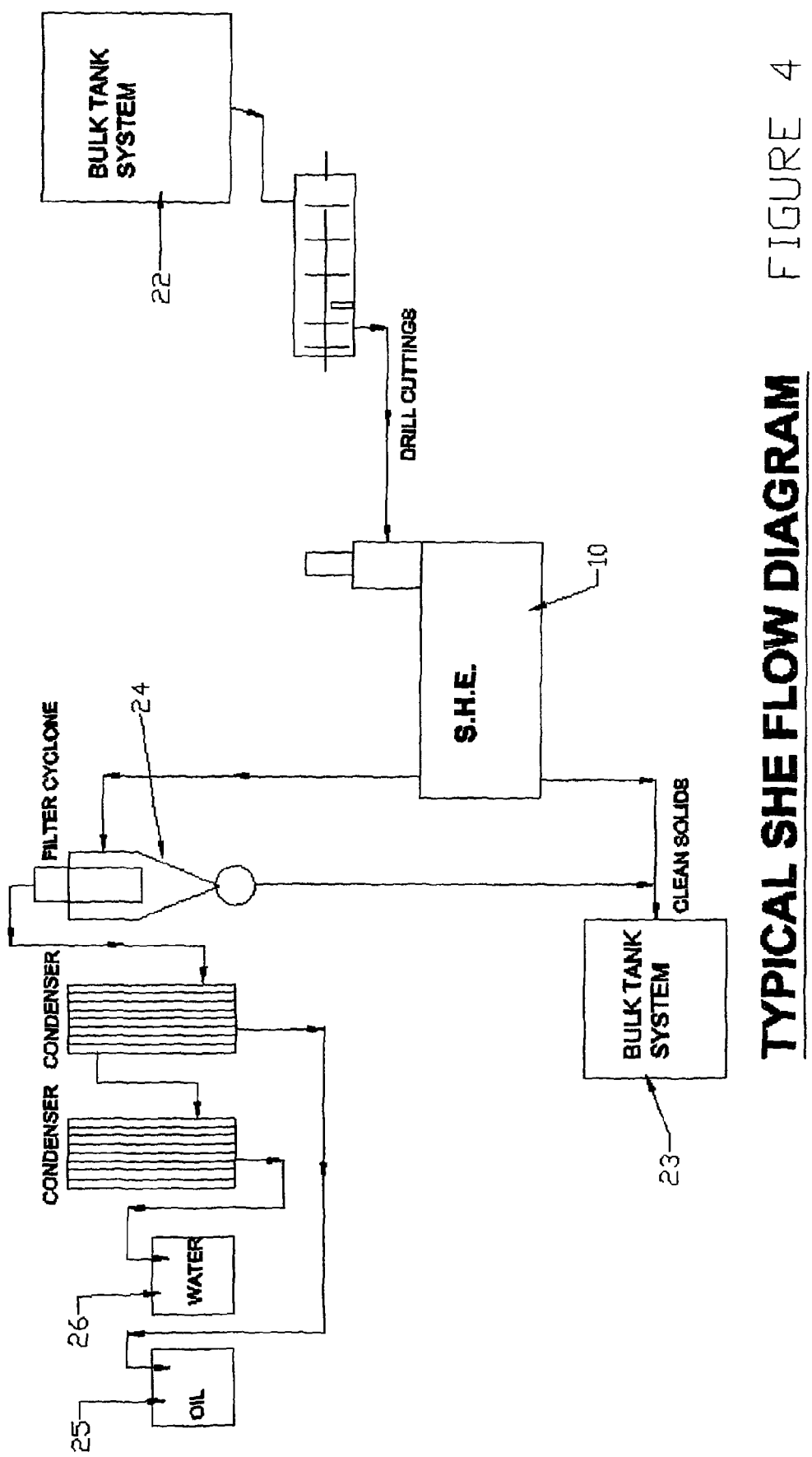

SOLIDS HEAT EXCHANGER

CROSS-REFERENCE TO RELATED APPLICATIONS

This application is a U.S. national phase application under the provisions of 35 U.S.C. § 371 of International Patent Application No. PCT/GB11/50424 filed Mar. 4, 2011, which in turn claims priority of United Kingdom Patent Application No. 1004535.9 filed Mar. 18, 2010. The disclosures of such international patent application and United Kingdom priority patent application are hereby incorporated herein by reference in their respective entireties, for all purposes.

The present invention relates to solids heat exchanger apparatus and method for processing drill cuttings and other hydrocarbon contaminated materials, in particular, though not exclusively, for recovering oil and/or hydrocarbons from drill cuttings.

BACKGROUND

The term drill cuttings as used herein refers to any material produced during drilling of a wellbore. For example, drill cuttings produced during drilling of a wellbore to access a subsurface hydrocarbon reservoir may typically comprise 70% solid matter, 15% water, and 15% oil. In the past, any drill cuttings produced offshore were simply dumped into the sea. However, this is now only permissible if the oil content of the drill cuttings is very low, typically less than 0.5% by mass. Accordingly, for the most part, drill cuttings produced offshore are stored on the drilling platform and then periodically shipped to shore for treatment. Such practices are, however, inefficient in terms of space utilisation, energy and cost.

Drill cuttings are brought to the surface in the drilling fluid. These fluids are then passed over a vibratory screen/shale shacker, to remove the solids which are in the form of an oil impregnated waste. The solids content can vary greatly depending on the formation being drilled through but are generally clay stone, silica or shale sands.

Currently the drill cuttings are stored in 5 tonne to 10 tonne skips which are generally called drill cuttings boxes (DCB). There can be 200 to 300 DCB required to drill a well and they are used to transport the drill cuttings back to shore for processing. More recently bulk tanks have been used to transport the cuttings to shore such a system is the Halliburton HCB Bulk System as designed and patented by William Curie. The bulk system eliminates 2000 offshore crane operations when drilling one well.

More recently, a system for processing drill cuttings has been used, which relies on mechanical manipulation of the drill cuttings to heat the drill cuttings for the purposes of separation of the oil and water from the solid matter. Such known processing systems typically utilise an electric motor for the mechanical manipulation. However, a processing system comprising a 750 kW electric motor may only have a throughput of approximately 2 to 3 tons of drill cuttings per hour and it would be desirable to increase the throughput or at least reduce the energy expended in processing the drill cuttings using such methods.

Accordingly there is a readily identifiable need for an effective method of treating the drill cuttings on the drilling rig so as to eliminate the need to transport drill cuttings to shore. Ideally if the oil on the cuttings can be reduced to less than 0.5% the solids can then simply be disposed of back in to the sea. The base oil can be reclaimed and reused.

BRIEF SUMMARY OF THE DISCLOSURE

In accordance with a first aspect of the present invention there is provided a solids heat exchanger comprising a shell and tube type heat exchanger having a shell side provided with a heating means and a tube side for receiving waste material to be heated wherein one or more tubes are provided each having extending longitudinally therein a screw conveyor rotatable so as to convey said material to be heated along the length of said tube.

Preferably the heating means comprises a through passage for receiving a heating fluid.

Preferably also the heating fluid is thermal oil.

Alternatively the heating fluid comprises hot exhaust or flue gases.

Optionally the heating means comprises induction heating means.

Preferably the apparatus has an operational temperature range of between 100 and 800 degrees.

Preferably drive means are provided for rotating said one or more screw conveyors.

Preferably the heating means is arranged to be capable of raising the temperature in the tube side sufficiently to vaporise oil and water in said waste material.

Preferably the apparatus has input means for receiving waste material at a first end and output means having outlets for oil and water vapour and soiled material separated from said vapour at a second end.

The input means may be arranged to be gravity fed by said waste material or means may be provided for feeding said waste material into the input means under pressure.

Preferably the waste material is in the form of drill cuttings or other material containing or contaminated with hydrocarbon material.

Preferably the heat exchanger further comprises a filter and condenser arrangement for separating oil, hydrocarbons and water from the output material.

According to a second aspect of the present invention there is provided a method of removing oil and water from drill cuttings or other hydrocarbon contaminated solids using the apparatus of the first aspect.

BRIEF DESCRIPTION OF THE DRAWINGS

Embodiments of the invention are further described hereinafter with reference to the accompanying drawings, in which

FIG. 4 is a flow diagram of a typical solids heat exchanger in accordance with the present invention; and

DETAILED DESCRIPTION

Figure 1:
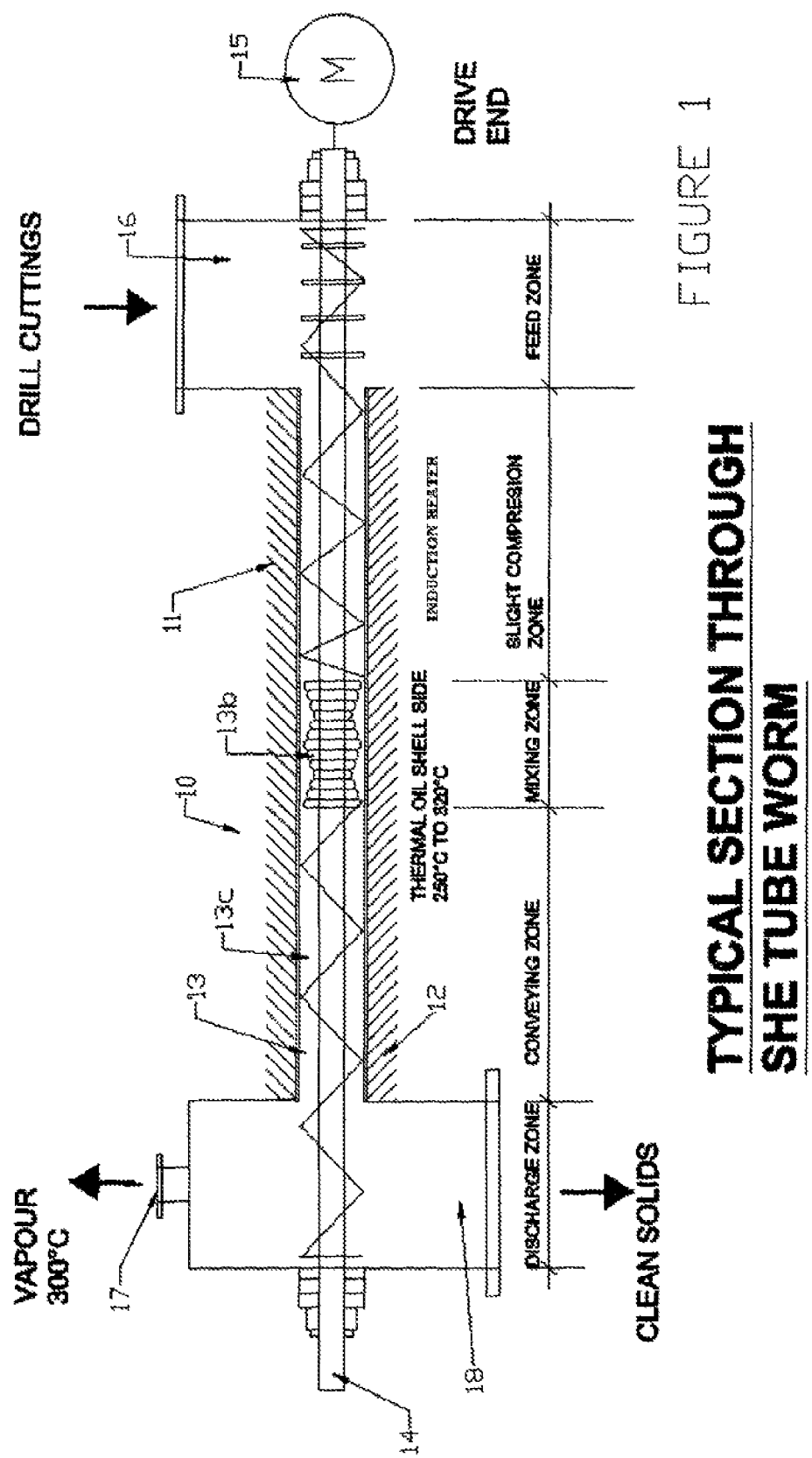
FIG. 1 is a simplified schematic section through a solids heat exchanger in accordance with the present invention.

Referring firstly to FIG. 1 a schematic basic layout of a solids heat exchanger is shown generally at 10. The heat exchanger is in the form of a shell and tube arrangement having a shell section 11 through which heated thermal oil 12 (or alternatively waste flue or exhaust gases containing otherwise waste heat) passes and a tube section 13. The tube section 13 has a screw conveyor 14 extending along its length and having a drive motor 15 at one end. Drill cuttings are fed in through an inlet 16 and then conveyed, and lightly compressed as they are carried into a first section 13a of the tube 13/ A middle section, 13b, is arranged to ensure good mixing of the drill cuttings (thus ensuring effective heat transfer with the shell section) before the drill cuttings are carried to the exit end of the tube 13 by a conveying section 13c. On exiting the tube 13 oil and water vapour rises and escapes through a first outlet 17 while the now cleaned drill cuttings fall through a second outlet 18 forming a discharge zone.

Figure 2:
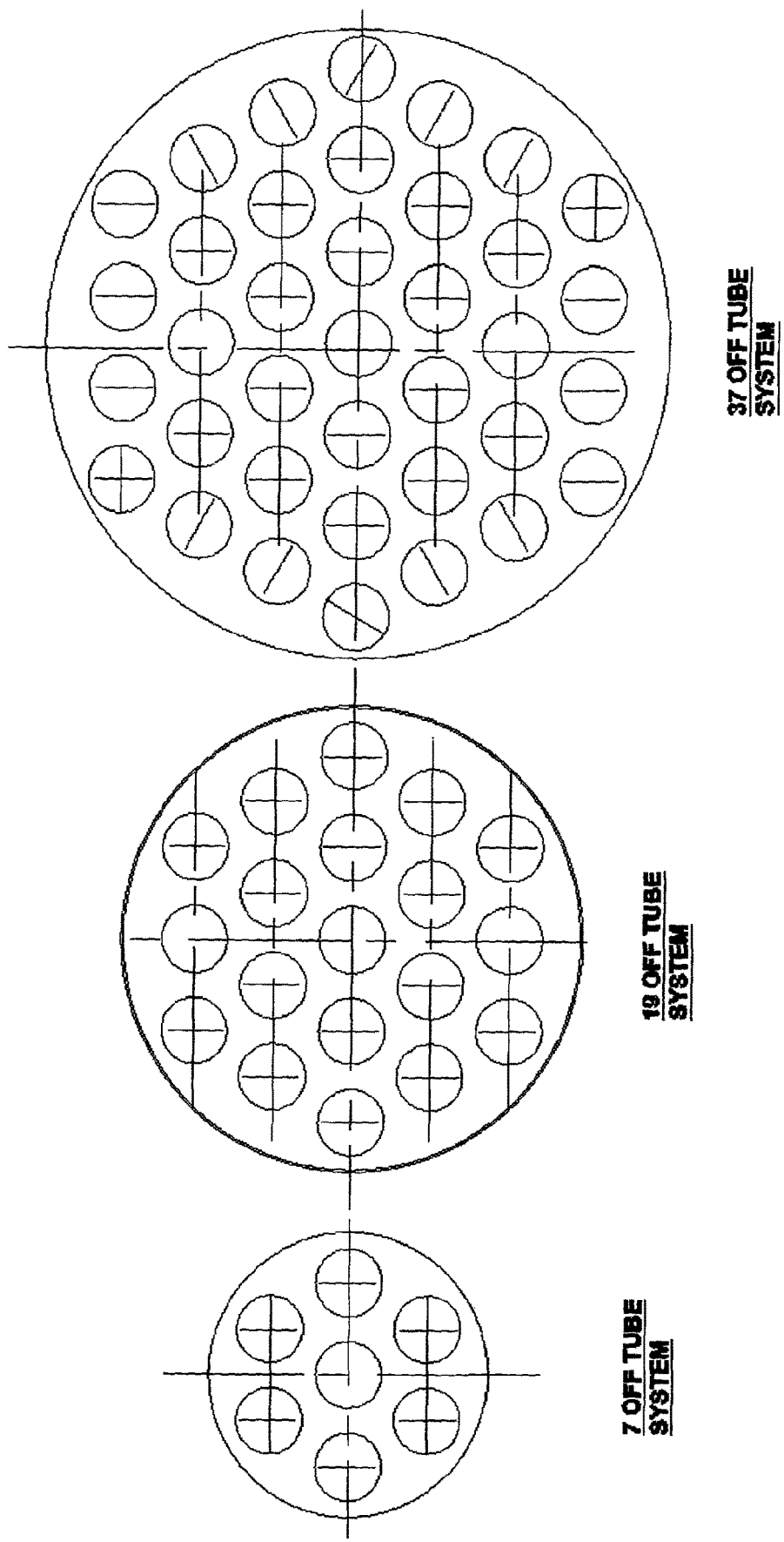
FIG. 2 provides an end view of three alternative tube configurations of a solids heat exchanger in accordance with the present invention.

While for clarity the apparatus of FIG. 1 shows a single tube the apparatus can, as illustrated in FIG. 2 be provided with multiple tube arrangements thus greatly increasing the heat transfer area.

Figure 3:
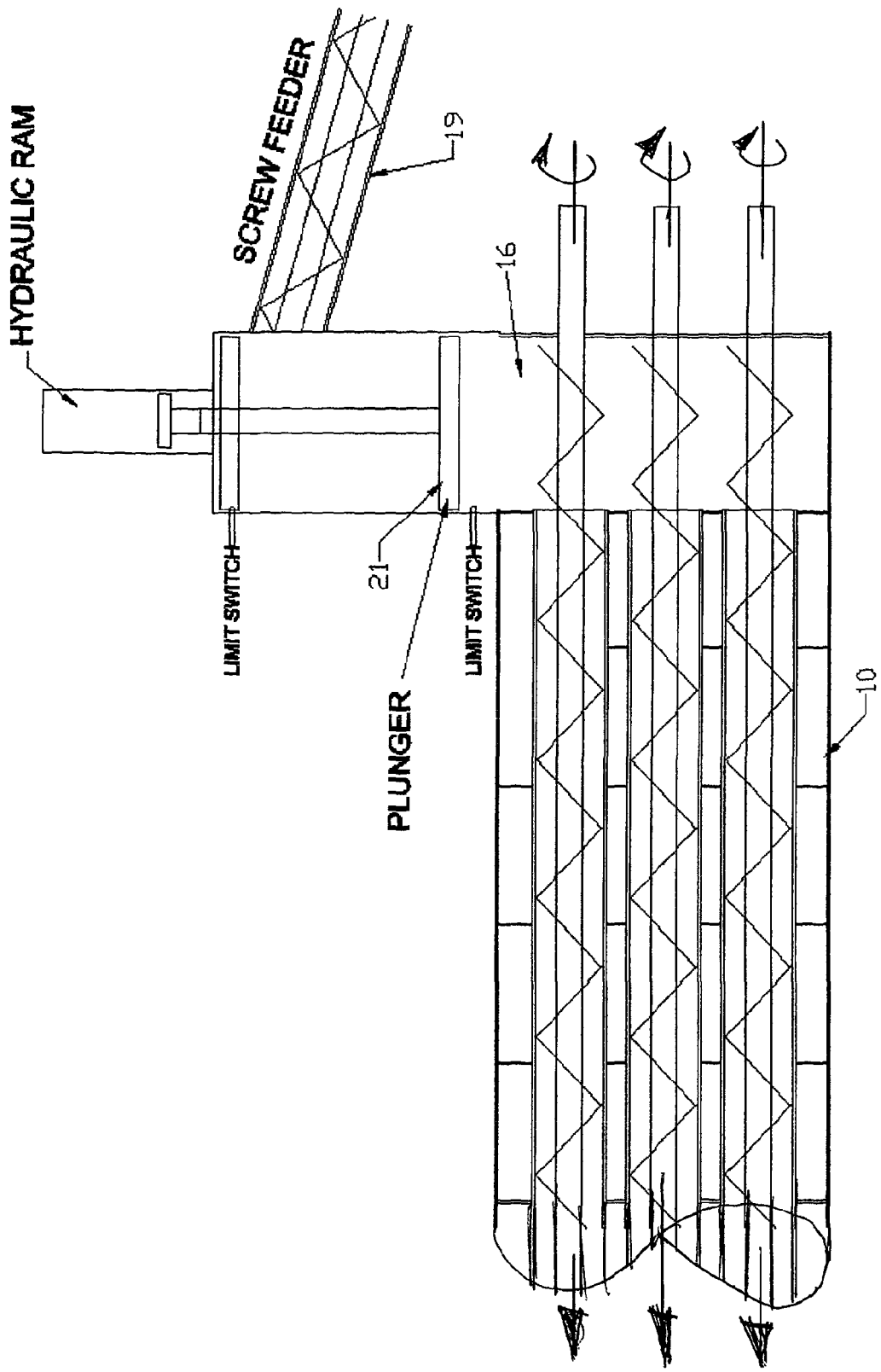
FIG. 3 is a schematic view of an optional material intake system of a solids heat exchanger in accordance with the present invention.

In the basic arrangement the drill cuttings can simply be gravity fed through the inlet 16. However optionally, referring now to FIG. 3, a forced intake system is illustrated. In this embodiment the intake 16 is fed with raw drill cuttings by a screw feeder arrangement 19 from a supply tank and a hydraulic ram 20 operates a plunger 21 which compresses the drill cuttings before they enter the heat exchanger 10.

Referring to FIG. 4 a flow diagram of the complete treatment process is shown. The heat exchanger 10 is supplied with drill cuttings from a bulk tank arrangement 22 as previously described. On exiting the heat exchanger the now clean drill cuttings are stored in a second bulk tank 23 for subsequent disposal. At the same time the oil and water vapour is first passed through a filter cyclone 24 before passing through a pair of condensers which in turn feed oil and water collection tanks 25 & 26.

The apparatus described is designed for use on a drilling platform or rig and eliminates the need to transport drill cuttings to shore, by treating the drill cuttings on the drilling rig. By reducing the oil on cuttings to less than 0.5% the solids can then simply be disposed of back in to the sea. The base oil can be reclaimed and reused.

The method of removing the oil from the drill cuttings is Thermal Desorption i.e. the drill cuttings are heated to a desired temperature where the oil vaporises. One of the issues we have in this process is the high water content and a lot of the energy is needed to flash off the water. Accordingly the apparatus is intended to be effective to raise the temperature of the solids to 280 deg C./300 deg C. to flash off the water and vaporise the oil.

By combining the technology of a Shell and Tube Heat Exchanger with multiple screw conveyors to pass the bulk solid through the tube side of the heat exchanger we ensure that the drill cuttings are in contact with as much of the heated surface area as possible. The thermal oil is passed through the shell side of the heat exchanger and passed back to the oil heater to maintain the desired high temperature. The transfer screw conveyors are designed in such a way as to achieve maximum contact with the tube heat transfer surface and also to ensure that a certain amount of mixing occurs within the tube to allow even heating of the drill cuttings. The heat transfer is further enhanced, and the apparatus kept relatively compact by having multiple tubes from 7 off through to, 19, 37, 61 or greater, as seen in FIG. 2, or any number in between. The drive system could be an electrical motor with a reducing gear box, sprocket and chain to multi screw or helical gears to drive multi screws. The multi-screw system could be driven individually by hydraulic motors powered by a single hydraulic power pack.

The following is an alternative arrangement. In place of the shell section for receiving thermal oil induction heating coils, arranged around a thermal insulator on a tube section are provided. The system uses a high frequency power supply and the induction coils generate heat directly within the wall of the tube section. The thermal insulator is interposed between the coils and the tube section to combat heat loss, increase efficiency and improve temperature control response. The induction heating coils are controlled by power and control modules. In other respects the apparatus operates in the same manner as the previous embodiment. However the induction heating coil is capable of operating over a wider temperature range, typically 100 to 800 degrees C.

The higher temperature capability of this embodiment means that the apparatus can operate in different modes to process a range of materials separating out water and hydrocarbons depending on the material.

Example modes are—Thermal Drying Mode for Bulk Solids, water only—Temp around 150° C.

Thermal Desorption Mode for Bulk Solids, water and hydrocarbons to C24—Temp 200° to 320° C. Thermal Desorption Mode for Bulk Solids, water and hydrocarbons to C40—Temp 200° to 420° C. Thermal Pyrolysis Mode for Organic materials, water, pyroils and pyrogas including waste tyre chips—Temp typically for waste tyre is 500° C. to 700° C.

Accordingly this embodiment has a wide range of applications including drying a waste to reduce its volume, treating contaminated soil, drill cuttings or processing waste tyres.

Example materials include drill cuttings, soil contaminated with hydrocarbons, oil sands, and tank sludges.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers and characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments.

The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of removing oil and water from waste material oil-contaminated drill cuttings comprising:
   a) introducing oil-contaminated drill cuttings into a shell and tube heat exchanger,
   wherein the shell and tube heat exchanger comprises:
      i) an induction heater,
      ii) a shell, iii) one or more tubes located inside the shell,
iv) input means configured to receive oil-contaminated drill cuttings and configured to provide oil-contaminated drill cuttings to each of the one or more tubes, and
v) a filter and condenser arrangement,
wherein a rotatable screw conveyor is located inside each of said one or more tubes, the induction heater is operable to provide variable operating temperature modes, and means are provided for feeding said oil-contaminated drill cuttings into the input means
b) using the means for feeding said oil-contaminated drill cuttings into the input means to provide oil-contaminated drill cuttings to each of the one or more tubes,
c) heating said one or more tubes using the induction heater so as to heat the oil-contaminated drill cuttings,
d) rotating the screw conveyor so as to convey the heated oil-contaminated drill cuttings,
wherein oil and water present in the heated oil-contaminated drill cuttings are conveyed out of the ends of said one or more tubes at a different rate than the remainder of the oil-contaminated drill cuttings, and
e) using the filter and condenser arrangement to separate oil, hydrocarbons and water from the output material.

2. A device comprising:
a) an induction heater,
b) a shell,
c) one or more tubes located inside the shell,
d) input means configured to receive waste material and configured to provide waste material to the one or more tubes,
e) a filter and condenser arrangement for separating oil, hydrocarbons and water from the output material, wherein:
i) a rotatable screw conveyor is located inside each of said one or more tubes,
ii) the induction heater is operable to provide variable operating temperature modes, and
iii) means for feeding said waste material into said input means.

3. The device of claim 2, having an operational temperature range of between 100 and 800 degrees C.

4. The device of claim 2, wherein drive means are provided for rotating said one or more screw conveyors.

5. The device of claim 2, wherein the induction heater is arranged to be capable of raising the temperature in the tube side sufficiently to vaporize oil and water in said waste material.

6. The device of claim 2, having output means having outlets for oil and water vapor and soiled material separated from said vapor at a second end.

7. The device of claim 5, wherein the input means is arranged to be gravity fed by said waste material.

8. A shell and tube heat exchanger for removing oil and water from oil-contaminated drill cuttings comprising:
a) an induction heater,
h) a shell,
c) one or more tubes located inside the shell,
d) input means configured to receive oil-contaminated drill cuttings and configured to provide oil-contaminated drill cuttings to the one or more tubes, and
e) a filter and condenser arrangement for separating oil, hydrocarbons and water from the output material, wherein:
i) a rotatable screw conveyor is located inside each of said one or more tubes,
ii) the induction heater is operable to provide variable operating temperature modes, and
iii) means are provided for feeding said oil-contaminated drill cuttings into said input means.

9. A shell and tube heat exchanger for removing oil and water from oil-contaminated drill cuttings comprising:
a) an induction heater,
b) a shell,
c) multiple tubes located inside the shell,
d) input means located at a first end of the shell and tube heat exchanger configured to receive oil-contaminated drill cuttings and configured to provide oil-contaminated drill cuttings to each of the multiple tubes,
e) output means having an outlet for oil vapor and water vapor and an outlet for soiled material separated from said oil vapor and water vapor outlet, wherein the output means is located at a second end of the shell and tube heat exchanger,
f) a filter and condenser arrangement for separating oil, hydrocarbons and water from the output material, wherein:
i) a rotatable screw conveyor is located inside each of said multiple tubes,
ii) the induction heater is operable to provide variable operating temperature modes,
iii) the shell and tube heat exchanger has an operational temperature range of between 100 and 800 degrees C.,
iv) means for feeding said oil-contaminated drill cuttings into said input means,
v) the filter and condenser arrangement comprises a filter cyclone.

10. A method of removing oil and water from oil-contaminated drill cuttings comprising:
providing a shell and tube heat exchanger for removing oil and water from oil-contaminated drill cuttings comprising:
a) an induction heater,
b) a shell,
c) multiple tubes located inside the shell,
d) input means located at a first end of the shell and tube heat exchanger configured to receive oil-contaminated drill cuttings and configured to provide oil-contaminated drill cuttings to each of the multiple tubes,
e) output means having an outlet for oil vapor and water vapor and an outlet for soiled material separated from said oil vapor and water vapor outlet, wherein the output means is located at a second end of the shell and tube heat exchanger,
f) a filter and condenser arrangement for separating oil, hydrocarbons and water from the output material, wherein:
i) a rotatable screw conveyor is located inside each of said multiple tubes,
ii) the induction heater is operable to provide variable operating temperature modes,
iii) the shell and tube heat exchanger has an operational temperature range of between 100 and 800 degrees C.,
iv) means are provided for feeding said oil-contaminated drill cuttings into said input means,
v) the filter and condenser arrangement comprises a filter cyclone, using the means for feeding said oil-contaminated drill cuttings into the input means to provide oil-contaminated drill cuttings to each of the multiple tubes, heating said multiple tubes using the induction heater so as to heat the oil-contaminated drill cuttings, rotating the screw conveyor so as to convey the heated oil-contaminated drill cuttings, wherein oil and water present in the heated oil-contaminated drill cuttings are conveyed out of the ends of said multiple tubes at a different rate than the remainder of the oil-contaminated drill cuttings, providing soiled material to the soiled material outlet of the output means and providing oil vapor and water vapor to the oil vapor and water vapor outlets of the output means, and using the filter and condenser arrangement to separate oil, hydrocarbons and water from the output material.

* * * * *